United States Patent
Chu et al.

(10) Patent No.: US 8,301,209 B2
(45) Date of Patent: Oct. 30, 2012

(54) MOBILE COMMUNICATION DEVICE WITH ERGONOMIC FEATURE

(75) Inventors: Tian-Han Chu, Shanghai (CN); Tian-You Wang, Shanghai (CN); Ryan Chang, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 429 days.

(21) Appl. No.: 12/648,064

(22) Filed: Dec. 28, 2009

(65) Prior Publication Data

US 2011/0053661 A1    Mar. 3, 2011

(30) Foreign Application Priority Data

Sep. 2, 2009   (TW) ................................ 98129593 A

(51) Int. Cl.
*H04B 1/38* (2006.01)
*H04M 1/00* (2006.01)

(52) U.S. Cl. .................. 455/575.1; 455/90.1; 455/90.3; 455/564

(58) Field of Classification Search .............. 455/575.1, 455/90.3, 550.1, 564, 57.1, 575.2, 575.9, 455/90.1

See application file for complete search history.

(56) References Cited

U.S. PATENT DOCUMENTS

| | | | | |
|---|---|---|---|---|
| 6,724,369 | B2 * | 4/2004 | Slotta ............................ | 345/161 |
| 6,925,315 | B2 * | 8/2005 | Langford ..................... | 455/575.1 |
| 7,096,036 | B2 * | 8/2006 | Griffin et al. .............. | 455/553.1 |
| 7,099,702 | B1 * | 8/2006 | Lundy .......................... | 455/566 |
| 7,272,411 | B2 * | 9/2007 | Griffin et al. .............. | 455/550.1 |
| 7,653,422 | B2 * | 1/2010 | Roberts ....................... | 455/575.4 |
| 7,805,159 | B2 * | 9/2010 | Griffin et al. .............. | 455/553.1 |
| 8,169,786 | B2 * | 5/2012 | Mangaroo .................... | 361/752 |
| 2002/0193080 | A1 * | 12/2002 | Komsi et al. ................ | 455/90 |
| 2007/0010211 | A1 * | 1/2007 | Mixon ......................... | 455/90.3 |

* cited by examiner

*Primary Examiner* — Tilahun B Gesesse

(74) *Attorney, Agent, or Firm* — WPAT, P.C.; Anthony King

(57) ABSTRACT

A mobile communication device with an ergonomic feature comprises a housing, a display unit, a first key module, and a second key module. The display unit is arranged on a lower part of one face of the housing, and the first key module is arranged on the housing on the same face as the display unit to locate closely above the display unit. The first key module comprises a plurality of upside keys which are arrayed into a laterally symmetric hexagonal configuration. The second key module comprises a plurality of lateral keys located on one of two opposite lateral surfaces of the housing. The keys of the two key modules are so arranged on the housing that either a right-handed or a left-handed user can conveniently operate the keys not only with a thumb but also the other four fingers while holding the device with one single hand.

10 Claims, 2 Drawing Sheets

MOBILE COMMUNICATION DEVICE WITH ERGONOMIC FEATURE

FOREIGN PRIORITY DOCUMENT

The incorporation of essential material in the specification by reference JP 098129593 dated Sep. 02, 2009 has been added.

FIELD OF THE INVENTION

The present invention relates to a mobile communication device, and more particularly to a mobile communication device with an ergonomic feature.

BACKGROUND OF THE INVENTION

Following the constant progress in different technological fields, people living in the modern society require more and more information to satisfy the need in their work, daily life, and entertainment. Therefore, for many people, a mobile communication device capable of providing various kinds of real-time information has become a requisite for life. Meanwhile, all the mobile communication device manufacturers also engage themselves in improving or increasing the functions of various types of mobile communication devices to satisfy the demands of different types of users.

The arrangement of the keypad on the mobile communication devices has a great influence on the users' habit in operating the devices, particularly when the users frequently use the mobile communication devices to send and receive short messages. Generally, a conventional mobile communication device has a keypad located below a display screen. A user would usually stably hold the device with two hands, in order to input text by pushing the keys on the keypad. Since most of the mobile communication devices have a center of gravity located at the display screen and a very small keypad size, it is difficult for users to stably hold the mobile communication devices with only one hand. Further, when a user holds a mobile communication device with only one hand and uses the thumb of the same hand to push the keys on the keypad, it would be uneasy for the thumb to push the keys located closer to the hand, resulting in a slowed input speed or incorrect input via wrong keys. Since the other four fingers of the same hand are used to hold the mobile communication device at one side opposite to the thumb, they are not effectively used to operate the keys. Moreover, with the display screen located above the keypad, someone else around the user can easily peep the text input by the user and shown on the display screen, resulting in undesired disclosure of personal privacy.

SUMMARY OF THE INVENTION

A primary object of the present invention is to provide a mobile communication device with an ergonomic feature, so that a user can more conveniently and more efficiently operate the keys on the mobile communication device.

To achieve the above and other objects, the mobile communication device with the ergonomic feature according to the present invention comprises a housing, a display unit, a first key module, and a second key module. The display unit is arranged on a lower part of one face of the housing, and the first key module is arranged on the housing on the same face as the display unit to locate closely above the display unit. The first key module comprises a plurality of upside keys, which are disposed in a laterally symmetric hexagonal configuration, allowing a user to conveniently operate the keys with a thumb. The second key module comprises a plurality of lateral keys located on one of two opposite lateral surfaces of the housing, allowing a user to operate these lateral keys with the other four fingers of the same hand.

The mobile communication device of the present invention can be any one of a mobile phone, a smartphone and a personal digital assistant.

Preferably, two of the six internal angles of the hexagonal configuration of the first key module that are closer to the two lateral surfaces respectively than the other four of the six internal angles are about 90 degrees each, and the other four internal angles are about 135 degrees each.

In the present invention, a sensor module is further disposed on the front surface of the housing, and a speaker module is further disposed on the front surface of the housing at a position adjacent to the first key module.

In an embodiment of the present invention designed for a right-handed user, the plurality of lateral keys of the second key module are provided on the left lateral surface of the housing and comprise a volume adjustment key, a key for answering a call, a hold key, and a key for hanging up; and a function menu key, a delete key, and a right navigation key are disposed in a right portion of the hexagonal configuration, and a return key, an enter key, and a left navigation key are disposed in a left portion of the hexagonal configuration.

In an embodiment of the present invention designed for a left-handed user, the plurality of lateral keys of the second key module are provided on the right lateral surface of the housing and comprise a volume adjustment key, a key for answering a call, a hold key, and a key for hanging up; and a return key, an enter key, and a right navigation key are disposed in a right portion of the hexagonal configuration, and a function menu key, a delete key, and a left navigation key are disposed in a left portion of the hexagonal configuration.

With the above arrangements, the mobile communication device with the ergonomic feature according to the present invention provides one or more of the following advantages:

(1) The mobile communication device can be held with one single hand and can therefore be easily and stably handled;

(2) The configuration of the first key module provides enlarged zones for convenient touch by the user's thumb, and therefore allows quick and correct input of text;

(3) The provision of the second key module on one lateral surface of the housing allows the user to efficiently operate the lateral keys with the other four fingers of the same hand holding the device; and (4) Since the display unit is located below the first key module, information entered by the user and shown in the display unit is always located within the user's hand without being easily peered by other people.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
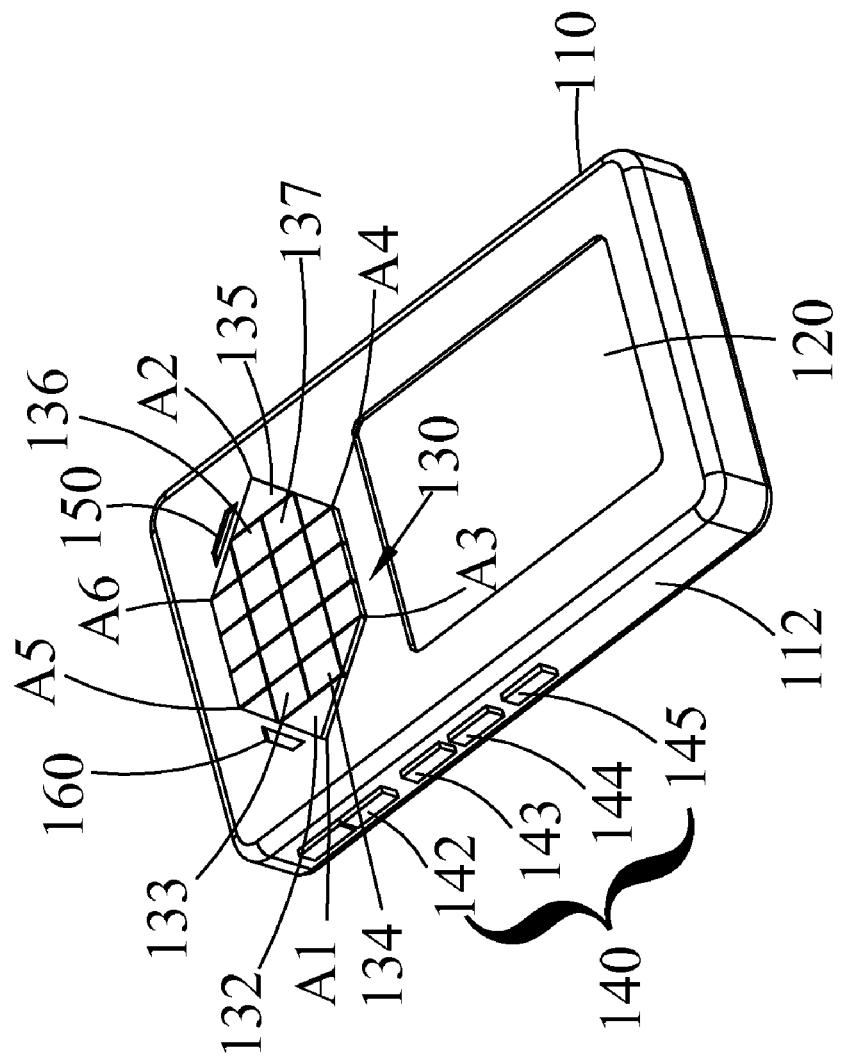
FIG. 1 is a perspective view of a mobile communication device with an ergonomic feature according to an embodiment of the present invention suitable for a right-handed user.

Please refer to FIG. 1 that is a perspective view of a mobile communication device 1 with an ergonomic feature according to an embodiment of the present invention suitable for a right-handed user. As shown, the mobile communication device 1 comprises a housing 110, a display unit 120, a first key module 130, and a second key module 140. The display unit 120 and the first key module 130 are arranged on the same face of the housing 110 and the first key module 130 is located above the display unit 120. Therefore, the display unit 120 is closer to a user than the first key module 130 when the user uses the mobile communication device 1 in a normal way. The second key module 140 is provided on one of two opposite lateral surfaces of the housing 110.

The first key module 130 comprises a plurality of upside keys which are disposed in a hexagonal configuration. The term "upside key" used herein refers to the key located at the upper part of the front surface of the housing 110, and the term "key" is herein used as a generic term which may also be a button or a knob. Two of the six internal angles of the hexagonal configuration that are closer to the two lateral surfaces respectively than the other four of the six internal angles are denoted as angle A1 and angle A2, which are about 90 degrees each. Therefore, the first key module 130 satisfies the ergonomics for a user to correspondingly touch a right side or a left side of the hexagonal configuration of the first key module 130 with his or her left thumb or right thumb, respectively. The user can hold the mobile communication device 1 with one single hand and effectively operate the first key module with his or her right hand or left hand. The other four internal angles of the hexagonal configuration A3, A4, A5 and A6 are about 135 degrees each, so that the first key module 130 is laterally symmetrically arranged for both right-handed and left-handed users to conveniently operate the first key module 130.

In FIG. 1, the second key module 140 is located at a left lateral surface 112 of the housing 110 of the mobile communication device 1, and comprises a plurality of lateral keys arranged in one row on the left lateral surface 112. The lateral keys in the second key module 140 comprise, from top to bottom, a volume adjustment key 142, a key 143 for answering a call, a hold key 144, and a key 145 for hanging up. The term "hold key" may mean a key that a user presses to interrupt a call temporarily. With this sequence of arrangement, the user can operate the lateral keys of the second key module 140 with the other four fingers of the same hand holding the mobile communication device 1. For example, to end a call, the user can directly push the key 145 for hanging up with one of the four fingers without the need to first remove the mobile communication device 1 from the user's ear and then use the thumb to locate and push the key 145 for hanging up. In this manner, call time and call cost that occurs when the user locates the key 145 for hanging up can be saved. Further, by arranging the hold key 144 between the key 143 for answering a call and the key 145 for hanging up, the probability of wrongly touching the key 143 for answering a call or the key 145 for hanging up can be reduced, and the user is also allowed to touch the hold key 144 during a call, switch the mobile communication device 1 from a handset mode to a loudspeaker mode, or turn off the display and switch to a standby mode after ending a call without wrongly touching an incorrect key, which would otherwise occur when only the thumb is used to push the keys on the mobile communication device 1.

The housing 110 is further provided with a speaker module 150 and a sensor module 160. The speaker module 150 is located near an upper right corner of the first key module 130 for a user to answer a call. The sensor module 160 is located near an upper left corner of the first key module 130. The sensor module 160 would emit a warning signal when the user's face approaches to the display unit 120, so that the user is reminded not to closely bear his or her face on the display unit 120 to leave undesirable oil or dirt on the display unit 120.

In FIG. 1, the upside keys located at a left side of the hexagonal configuration of the first key module 130 comprise a left navigation key 132, a return key 133, and an enter key 134. Wherein, the term "left navigation key" may mean a key that a user presses to make the cursor or the indicator on a screen move to the left; the term "return key" may mean a key that a user presses to return to a previous screen; and the term "enter key" may mean a key that a user presses to confirm the selected icon and/or enter a next screen. The upside keys located at a right side of the hexagonal configuration of the first key module 130 comprise a right navigation key 135, a function menu key 136, and a delete key 137. Wherein, the term "right navigation key" may mean a key that a user presses to make the cursor or the indicator on a screen move to the right; the term "function menu key" may mean a key that a user presses to display the menu of functions for the type of operation he is trying to perform; and the term "delete key" may mean a key that a user presses to delete characters in a text. The above keys are arranged in consideration of a right-handed user's habit in touching the keys. Since the return key 133 and the enter key 134 are more frequently used by the user, and the right-handed user can easily touch and push the left side of the first key module 130 with the right thumb, these two keys 133, 134 are arranged at the left side of the first key module 130 for the right-handed user to operate these keys 133, 134 more conveniently. However, it is understood the keys of the first key module 130 can be differently arranged without being restricted to the above-described manner. Other frequently used keys can be arranged at the left side of the first key module 130, and other function keys can be arranged between he key 143 for answering a call and the key 145 for hanging up without departing from the spirit and the scope of the present invention.

Figure 2:
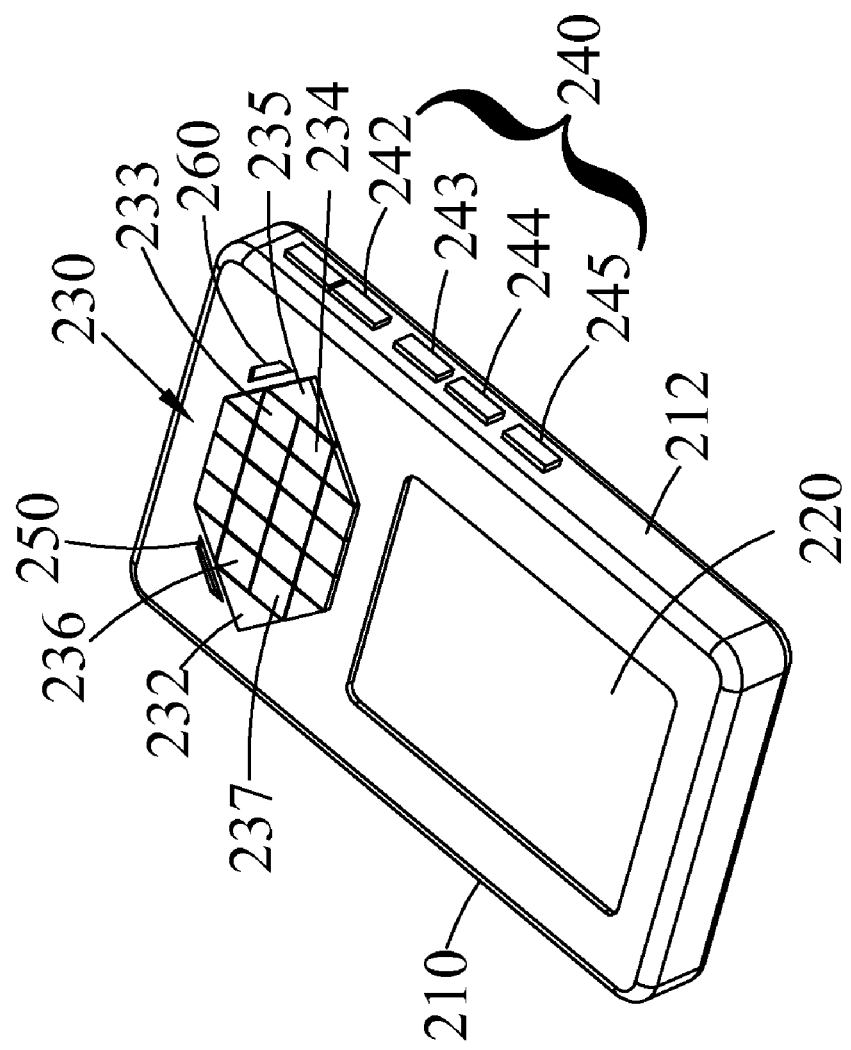
FIG. 2 is a perspective view of a mobile communication device with an ergonomic feature according to another embodiment of the present invention suitable for a left-handed user.

FIG. 2 is a perspective view of a mobile communication device 2 with an ergonomic feature according to another embodiment of the present invention suitable for a left-handed user. As shown, the mobile communication device 2 comprises a housing 210, a display unit 220, a first key module 230, and a second key module 240. Keys arranged at the right side of the first key module 230 comprise a right navigation key 235, a return key 233, and an enter key 234; and keys arranged at the left side of the first key module 230 comprise a left navigation key 232, a function menu key 236, and a delete key 237. The above-described arrangement of keys of the first key module 230 is suitable for a left-handed user to operate. Since the return key 233 and the enter key 234 are more frequently used by the user, and the left-handed user can easily touch and push the right side of the first key module 230 with the left thumb, these two keys 233, 234 are arranged at the right side of the first key module 230 for the left-handed user to operate them more conveniently.

In FIG. 2, the second key module 240 is located at the right lateral surface 212 of the housing 210 closer to the first key module 230, and comprises a plurality of lateral keys arranged in one row on the right lateral surface 212. The lateral keys in the second key module 240 comprise, from top to bottom, a volume adjustment key 242, a key 243 for answering a call, a hold key 244, and a key 245 for hanging up. With this sequence of arrangement, the user can operate the lateral keys of the second key module 240 with the other four fingers of the same hand holding the mobile communication device 2. For example, to end a call, the user can directly push the key 245 for hanging up with one of the four fingers without the need to first remove the mobile communication device 2 from the user's ear and then use the thumb to locate and push the key 245 for hanging up. In this manner, call time and call cost that occurs when the user locates the key 245 for hanging up can be saved. Further, by arranging the hold key 244 between the key 243 for answering a call and the key 245 for hanging up, the probability of wrongly touching the key 243 for answering a call or the key 245 for hanging up can be reduced, and the user is also allowed to touch the hold key 244 during a call, switch the mobile communication device 2 from a handset mode to a loudspeaker mode, or turn off the display unit 220 and switch to a standby mode after ending a call without wrongly touching an incorrect key, which would otherwise occur when only the thumb is used to push the keys on the mobile communication device 2.

It is understood the keys of the first key module 230 can be differently arranged without being restricted to the above-described manner. Other frequently used keys can be arranged at the right side of the first key module 230, and other function keys can be arranged between the key 243 for answering a call and the key 245 for hanging up without departing from the spirit and the scope of the present invention.

As can be seen in FIG. 2, the housing 210 is further provided with a speaker module 250 and a sensor module 260. The speaker module 250 is located near an upper left corner of the first key module 230 for a user to answer a call. The sensor module 260 is located near an upper right corner of the first key module 230. The sensor module 260 would emit a warning signal when the user's face approaches to the display unit 220, so that the user is reminded not to closely bear his or her face on the display unit 220 to leave undesirable oil or dirt on the display unit 220. Other elements and the arrangement thereof on the mobile communication device 2 designed for left-handed users are similar to that on the mobile communication device 1 designed for right-handed users. The mobile communication devices 1, 2 according to the above-described embodiments of the present invention can be mobile phones, smartphones, or personal digital assistants.

The mobile communication device according to the present invention can be held with one single hand and can therefore be easily and stably handled. Further, the configuration of the first key module provides enlarged zones for convenient touch by the user's thumb, and therefore allows quick and correct input of characters.

Moreover, the mobile communication device according to the present invention provides the second key module on one lateral surface of the housing, allowing the user to efficiently operate the keys in the second key module with the other four fingers of the same hand holding the device. Further, in the present invention, since the display unit is located below the first key module, information entered by the user and shown in the display unit is always located within the user's hand without being easily peered by other people.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A mobile communication device with an ergonomic feature, comprising:
   a housing;
   a display unit arranged on a front surface of the housing and located at a lower part of the front surface;
   a first key module comprising a plurality of upside keys arranged on the front surface of the housing and located at an upper part of the front surface, and the plurality of upside keys being disposed in a hexagonal configuration; and
   a second key module comprising a plurality of lateral keys arranged on one of two opposite lateral surfaces of the housing;
   wherein the hexagonal configuration has six internal angles, two of the six internal angles that are closer to the two lateral surfaces respectively than the other four of the six internal angles are about 90 degrees each, and the other four internal angles are about 135 degrees each.

2. The mobile communication device with the ergonomic feature as claimed in claim 1, wherein the mobile communication device is a mobile phone, a smartphone, or a personal digital assistant.

3. The mobile communication device with the ergonomic feature as claimed in claim 1, further comprising a sensor module disposed on the front surface of the housing.

4. The mobile communication device with the ergonomic feature as claimed in claim 1, further comprising a speaker module disposed on the front surface of the housing at a position adjacent to the first key module.

5. The mobile communication device with the ergonomic feature as claimed in claim 1, wherein the plurality of lateral keys are located on a left one of the two lateral surfaces of the housing, and comprises a volume adjustment key, a key for answering a call, a hold key, and a key for hanging up.

6. The mobile communication device with the ergonomic feature as claimed in claim 5, wherein a function menu key, a delete key, and a right navigation key are disposed in a right portion of the hexagonal configuration.

7. The mobile communication device with the ergonomic feature as claimed in claim 6, wherein a return key, an enter key, and a left navigation key are disposed in a left portion of the hexagonal configuration.

8. The mobile communication device with the ergonomic feature as claimed in claim 1, wherein the plurality of lateral keys are located on a right one of the two lateral surfaces of the housing, and comprises a volume adjustment key, a key for answering a call, a hold key, and a key for hanging up.

9. The mobile communication device with the ergonomic feature as claimed in claim 8, wherein a return key, an enter key, and a right navigation key are disposed in a right portion of the hexagonal configuration.

10. The mobile communication device with the ergonomic feature as claimed in claim 9, wherein a function menu key, a delete key, and a left navigation key are disposed in a left portion of the hexagonal configuration.

* * * * *